United States Patent
Allen

(10) Patent No.: US 10,129,353 B2
(45) Date of Patent: *Nov. 13, 2018

(54) OVERLAY NETWORKS FOR APPLICATION GROUPS

(71) Applicant: Amazon Technologies, Inc., Seattle, WA (US)

(72) Inventor: Nicholas Alexander Allen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/464,096

(22) Filed: Mar. 20, 2017

(65) Prior Publication Data

US 2017/0195443 A1  Jul. 6, 2017

Related U.S. Application Data

(63) Continuation of application No. 15/146,823, filed on May 4, 2016, now Pat. No. 9,602,612, which is a continuation of application No. 14/310,916, filed on Jun. 20, 2014, now Pat. No. 9,338,092.

(51) Int. Cl.
| | |
|---|---|
| *H04L 29/06* | (2006.01) |
| *H04L 29/08* | (2006.01) |
| *H04L 12/741* | (2013.01) |
| *H04L 29/12* | (2006.01) |
| *H04L 12/715* | (2013.01) |
| *G06F 21/60* | (2013.01) |

(52) U.S. Cl.
CPC .......... *H04L 67/28* (2013.01); *G06F 21/606* (2013.01); *H04L 45/64* (2013.01); *H04L 45/74* (2013.01); *H04L 61/103* (2013.01); *H04L 61/25* (2013.01); *H04L 63/0281* (2013.01); *H04L 63/0428* (2013.01); *H04L 63/0471* (2013.01); *H04L 63/08* (2013.01)

(58) Field of Classification Search
CPC ............ H04L 63/0428; H04L 63/0471; H04L 63/0435; H04L 63/0281; H04L 63/0464
USPC ........................................................ 713/153
See application file for complete search history.

(56) References Cited

U.S. PATENT DOCUMENTS

| | | | |
|---|---|---|---|
| 2007/0180493 A1 | 8/2007 | Croft et al. | |
| 2007/0186212 A1 | 8/2007 | Mazzaferri et al. | |
| 2007/0192329 A1 | 8/2007 | Croft et al. | |
| 2007/0198656 A1 | 8/2007 | Mazzaferri et al. | |
| 2009/0300730 A1* | 12/2009 | Chaudhry | H04L 63/1408 726/5 |
| 2011/0214157 A1* | 9/2011 | Korsunsky | G06F 21/55 726/1 |
| 2013/0033993 A1 | 2/2013 | Cardona et al. | |
| 2013/0036094 A1* | 2/2013 | Fippel | G06Q 10/06 707/640 |

(Continued)

OTHER PUBLICATIONS

U.S. Appl. No. 14/310,946, filed Jun. 20, 2014.

*Primary Examiner* — William S Powers
(74) *Attorney, Agent, or Firm* — Davis Wright Tremaine LLP

(57) ABSTRACT

A communication to a network location is detected at a computing device. The communication to the network location is encrypted dependent at least in part on whether the network location is at a different computing device from the computing device.

20 Claims, 11 Drawing Sheets

(56) References Cited

U.S. PATENT DOCUMENTS

2014/0282889 A1 9/2014 Ishaya et al.
2015/0172183 A1 6/2015 DeCusatis et al.

* cited by examiner

OVERLAY NETWORKS FOR APPLICATION GROUPS

CROSS-REFERENCE TO RELATED APPLICATIONS

This application incorporates by reference for all purposes the full disclosure of co-pending U.S. patent application Ser. No. 15/464,102, filed concurrently herewith, entitled "OVERLAY NETWORKS FOR APPLICATION GROUPS," and is a continuation of U.S. patent application Ser. No. 15/146,823, filed May 4, 2016, entitled "OVERLAY NETWORKS FOR APPLICATION GROUPS," which is a continuation of U.S. patent application Ser. No. 14/310,916, filed Jun. 20, 2014, entitled "OVERLAY NETWORKS FOR APPLICATION GROUPS," which incorporates by reference for all purposes the full disclosure of co-pending U.S. patent application Ser. No. 14/310,946, filed Jun. 20, 2014, entitled "ACCELERATION OF DATA ROUTING IN AN APPLICATION GROUP," the disclosures for which are incorporated by reference herein in their entirety.

BACKGROUND

In enterprise networks and other types of networks, applications that run on computer systems may often be configured to communicate with one another. For example, an application that is dedicated for hosting a website may communicate with another application that tracks details of financial transactions between parties in order to provide a user with web-based access to the financial transactions. As the number of applications in a system grows so does the number of the computer systems that execute the applications. Furthermore, it will become increasingly difficult to secure and protect the flow of data between the applications. For example, when an application is added to the system, the application may be required to be "retrofitted" for secure communication with other applications in the system.

Accordingly, it is often challenging to provide an overlay network for enabling protected communication between applications that are members of an application group. Further, it is also challenging to configure the overlay network in a manner that optimizes communications between applications executed on virtual computer systems that are instantiated on the same underlying host computer system.

BRIEF DESCRIPTION OF THE DRAWINGS

Various embodiments in accordance with the present disclosure will be described with reference to the drawings, in which.

DETAILED DESCRIPTION

Figure 1:
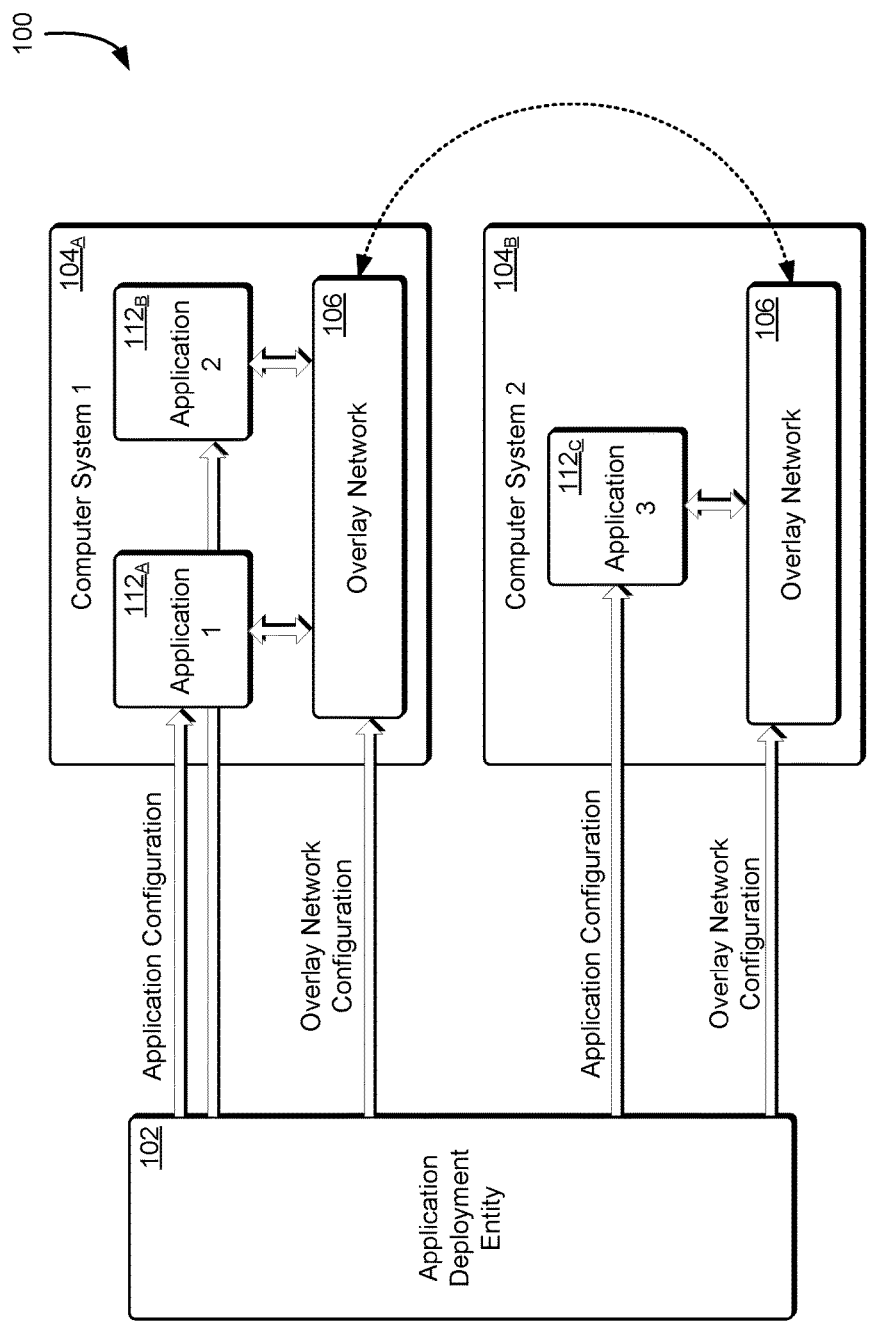
FIG. 1 shows an example of an environment for deploying applications to computer systems in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include utilizing an overlay network to facilitate protected or secured communication between applications. An application may be any type of executable instructions or program that causes a computer to perform one or more tasks. For example, the application may include a set of instructions that cause the computer to operate in a specified manner, whereby the application may include one or more software modules or execution routines, among others. As described herein a computer may be any type of device that is configured to enable performing computing operations. For example, the computer may be equipped with a processing unit, such as a central processing unit (CPU), that performs operations as specified by the application as well memory configured to store the application. It is noted that computer may be a virtual computer system that is instantiated using an underlying resources of a host computer.

The overlay network may be a logical network that is configured to operate using existing network and computing resources. The overlay network may utilize the computing resources provided by a computer system (for example, the computer system executing the application or to which the application is deployed) as well as the networking resources provided by the computer system and public or private networks (such as, an intranet or the Internet) over which the computer system is configured to exchange data. As a logical structure, the overlay network may be a gateway for an application. For example, the overlay network may be a protocol layer between the application and lower communications layers. When an overlay network is provided, data originating from the application may be received by an entity of the overlay network and routed using existing resources to a destination application. Another entity of the overlay network may receive the routed data and provided the routed data to the destination application. The routing of the data may be done as specified by routing configurations of the overlay network. Further, at a point in the data path between the two applications, the data may be operated upon (for example, by encryption or decryption) if the data is transmitted over a public network. Further, source or destination addresses may be modified to facilitate the routing.

The overlay network is advantageous in that application development (for example, for the purposes of configuring an application to operate as desired) may be decoupled from the protection of data that is necessary to be enforced when data is transmitted over public or unsecure channels. Further, the use of the overlay network is advantageous in that it permits scaling the number of applications used in a distributed system without the need to independently modify, upgrade or "retrofit" each application to achieve efficient or secure communications between the applications of the distributed system. Further, as a security level of a network used by interconnected applications changes, the configuration of the overlay network and associated entities may be modified to achieve a desired level of protected communications between the applications without the need to change the configurations of the independent applications.

A plurality of applications may be members of an application group. As members of the application group, the plurality of applications may operate in a concerted fashion and have a level of trust between one another. For example, the plurality of applications may exchange data between one another, whereby for proper operation of the applications the data may be trusted. Each application may be executed on a different computer system or two or more applications may be executed on the same computer system. The computer system executing the application may be configured with an application overlay entity, which may be a program, process, service, application, module or another type of computer system entity. The application overlay entity may be shared among applications executed on the computer system or each application may be associated with an independent application overlay entity. The application overlay entity may be configured to route data between the application and a proxy overlay entity. Use of the application overlay entity is advantageous in that it ensures that data originating from the application is routed to the proxy overlay entity and vice-versa without the need to establish routing preferences.

The proxy overlay entity may be configured with the network addresses and identities of applications that are members of the application group and their associated computer systems. Upon receiving data that originates from the application, the proxy overlay entity may identify whether the destination application is executed on the same computer system. If so, the proxy overlay entity may route the data to the proxy overlay entity serving the destination application or the application overlay entity serving the destination application in the event that the two applications are served by the same proxy entity. If it is determined that the destination application is executed on a different computer system, the proxy overlay entity may be configured to perform one or more operations (such as encryption) on the data to protect or secure the data while transmitted over a network and cause the data to be sent to the other computer system. In the receiving computer system and in a similar manner as performed by the originating computer system, a proxy overlay entity of the destination computer system may reverse the effect of the one or more operations and cause the data to be provided to the destination application.

Accordingly, the use of an overlay network decouples data communication between applications and protecting and securing the data from application execution. Further, as the security of the network used for carrying data between applications changes, the configuration of the applications may remain unchanged and only the configuration of the overlay network may be modified to ensure secured communication between the applications.

As described herein, a computer system executing an application may be a virtual computer system that is instantiated using computing resources provided by a host computer system. The host computer system may enable configuring a plurality of virtual computer systems, whereby each virtual computer system may execute one or more applications of an application group. To minimize communication latency between the applications and avoid unnecessary transmission of data over a network when two applications are executed using the same host computer system, a virtualization layer (such as a hypervisor) may be used for accelerating communications between the applications.

FIG. 1 shows an example of an environment for deploying applications to computer systems in accordance with at least one embodiment. In the environment 100, an application deployment system 102, which may be a computer system, server or host, among others, is configured to deploy or send a first application $112_A$ and a second application $112_B$ (denoted as application 1 and application 2) to be executed on a first computer system (denoted as computer system 1 and referred to herein as first computer system $104_A$) and a third application $112_C$ (denoted as application 3) to be executed on a second computer system (denoted as computer system 2 and referred to herein as second computer system $104_B$). The application deployment system 102 further configures an overlay network 106 on the first computer system $104_A$ and the second computer system $104_B$. The overlay network 106, which may have one or more associated entities (not shown) on each computer system, facilitates secure communication between the applications $112_{A-C}$. The overlay network 106 is configured with routing information for the applications $112_{A-C}$ that is used to determine destinations for data routing. Further, the overlay network 106 may be configured with credentials that specify one or more actions or operations that are to be performed on data exchanged between the applications $112_{A-C}$ prior to transmission over a public network.

Figure 2:
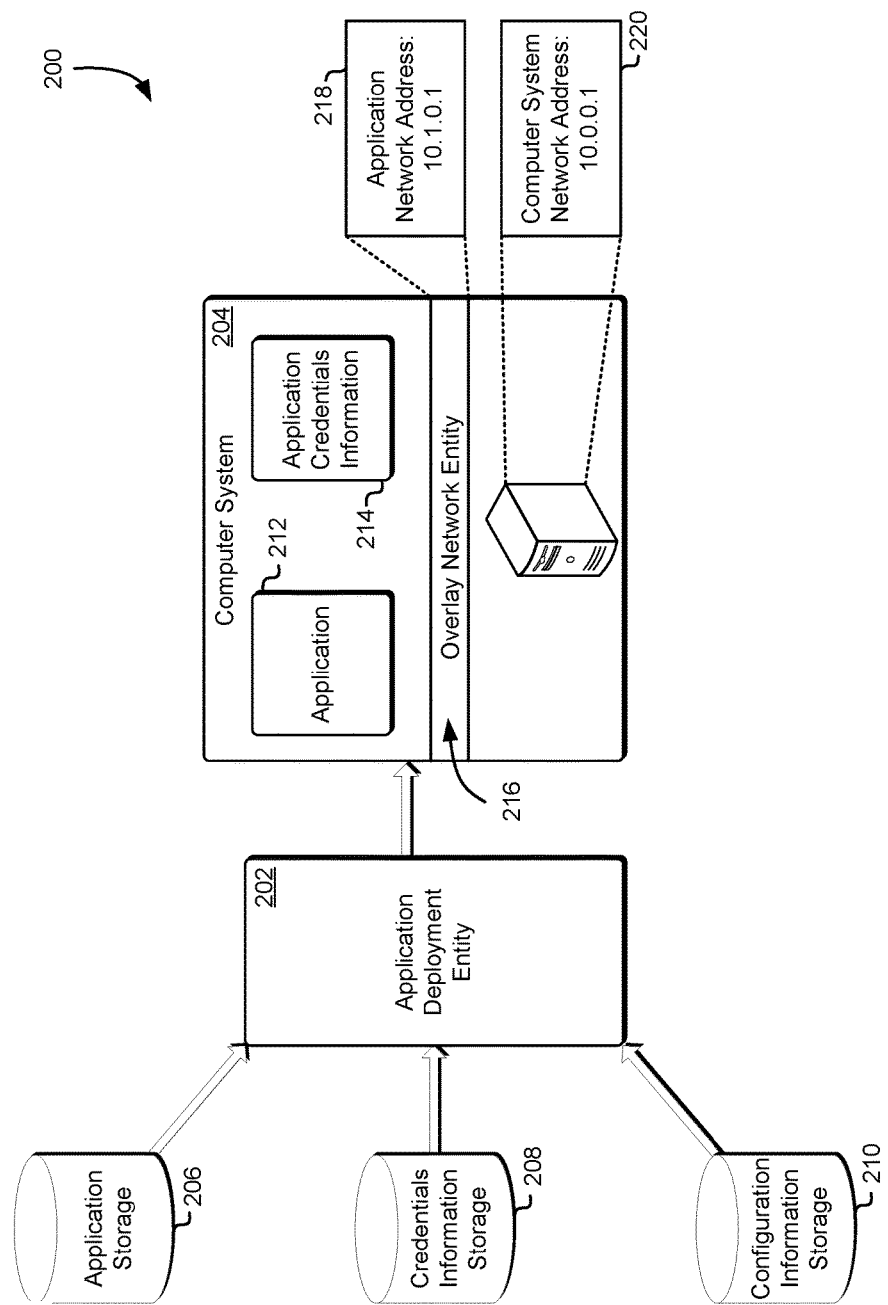
FIG. 2 shows an example of an environment for application deployment in accordance with at least one embodiment.

FIG. 2 shows an example of an environment for application deployment in accordance with at least one embodiment. In the environment 200, an application deployment entity 202, which may be a server, host or computer system, among others, is configured to provide an application to a computer system 204 for execution. The application deployment entity 202 may have an associated application storage 206, credentials information storage 208 and configuration information storage 210. The application storage 206, credentials information storage 208 or configuration information storage 210 may be any type of storage devices, such as hard drives, hard disks or solid state drives, among others, that are used to retain data for application deployment. For example, the storages 206-210 may utilize the resources provided by a local or remote (network-based) storage service to retain application data or other data. In various embodiments, the application data may be stored in a distributed manner on a plurality of storage devices or may be centrally stored on one storage device.

The computer system 204 may be any type of device that is capable of providing computing functionality. For example, the computer system 204 may be a server, host, desktop computer or laptop computer, among others. The computer system 204 may be equipped with a processor, such as a central processing unit (CPU) or a graphics processing unit (GPU), that provides computing functionality to a user. Examples of a CPU include those utilizing a complex instruction set computing (CISC) architecture, such as the x86 CPU, and others that utilize a reduced instruction set computing (RISC) architecture, such as the advanced RISC machine (ARM) CPU. The computer system 204 may also be equipped with hardware devices that facilitate communicating over a network (not shown) with other computer systems or routing devices, among others. The hardware devices may include any type of network device, modem, network interface card or network adapter, whereby communication using the hardware device may be wired or wireless. Wired communications may performed using an Ethernet protocol, among others, and wireless communication may be performed using an Institute for Electrical and Electronics Engineers (IEEE) 802.11, 802.16 or 802.21 communication protocol or short range communications protocol, among others. Further, the transmission control protocol (TCP) or Internet protocol (IP), among others may be used for communicating packet data over the network. The computer system 204 may further be equipped with an operating system and may be configured to execute software applications and programs compatible with the operating systems.

As described herein, an application may be a program (for example, a software program) that causes the computer to perform one or more tasks. For example, the application may be a program that enables the computer system 204 or another computer system to execute or host a website or enable performing financial transactions between parties or providing the details of the financial transactions to a monitoring system. An application may also include an operating system or a software utility that may be executed on the computer system.

The application storage 206 may store a deployment manifest for an application that specifies one or more data objects associated with an application, whereby a data object may, for example, be a computer-readable file that is required to be executed on the computer system 204 for the application to be run on the computer system 204. In addition, the application storage 206 may also store the one or more data objects associated with the application. To cause an application to be executed on the computer system 204, the application deployment entity 202 causes the one or more data objects associated with the application to be provided to the computer system 204. For ease of description, application deployment is utilized herein to refer to any process involving deployment of the application's underlying data objects to the computer system 204.

The credentials information storage 208 may store credentials information for use in communication between applications. The credentials information may specify the manner in which data that is provided by a first application to a second application may be encrypted prior to being sent over a network or transmitted over a communication channel. Further, the credentials information may specify the decryption of the data, whereby the encryption and the decryption may be symmetric operations. Besides encryption and decryption, the credentials information may specify any bit-, byte- or packet-wise manipulation that may be performed on the data such as scrambling and descrambling, encoding and decoding, checksum generation and validation, compression and decompression or hashing. The credentials information may be used to secure communication between applications and protect the communication from eavesdropping by a third-party.

The credentials information 214 may be provided by the application deployment entity 202 to the computer system 204 executing the application 212. Further, credentials information required for receiving data from the application 212 may be provided to another computer system (not shown in FIG. 2), whereby the computer system may be executing a second application. The credentials information provided to both computer systems may be used to enable unidirectional or bidirectional data exchanges between the two applications. For example, data that is encrypted, scrambled or encoded by a transmitting computer system may be encrypted, scrambled or encoded by a receiving computer system in accordance with the credentials information.

The configuration information storage 210 may retain information pertaining to the identity of computer systems to which an application is to be deployed, among others. For example, the information may specify that the application 212 is to be deployed to the computer system 204 as shown in FIG. 2. Accordingly, the application deployment entity 202 may cause one or more data objects required for the application to be executed on the computer system 204 to be sent to the computer system 204. The information retained by the configuration information storage 210, which is collectively referred to herein as configuration information, may also specify a relationship between applications which may be subject to deployment by the application deployment entity 202. The relationship between the applications may indicate that two or more applications are designated as being part of an application group as described herein. The two or more applications may have a level of trust with respect to one another that is not extended to other applications or a wider network. Further, data that is exchanged between applications of the same application group may be protected or secured from third-parties outside of the application group. The configuration information may also specify a configuration of one or more proxy entities associated with the application and used to route application data. For example, the configuration information may specify the identities of one or more applications that are served by the proxy entity and whose associated data is routed by the proxy entity. In addition, the configuration information may also specify routing table configurations for any entity routing data associated with the application.

Although described as being different entities, the application storage 206, credentials information storage 208 and configuration information storage 210 may be implemented as being part of the same entity or storage system. For example, any one of the storages 206-210 may be a database that is used by the application deployment entity 202 to store information needed for application deployment and communication between applications that are part of an application group.

The application deployment entity 202 utilizes the configuration information to identify one or more applications that are to be deployed to the computer system 204. The application deployment entity 202 may then retrieve any necessary data objects from the application storage that may be required to be provided to the computer system 204 for the one or more applications to be executed on the computer system 204 and may cause the data objects to be provided to the computer system 204. In addition, for each deployed application, the application deployment entity 202 identifies based at least in part on the configuration information other applications that are part of the deployed application's application group. The application deployment entity 202 causes credentials information that facilitate communication between applications of the application group to be deployed to the computer system 204. For example, due at least in part to the fact that computer system 204 executes an application 212 that is part of the application group, configuration information that specifies encryption or decryption information, among others, that may be used in communicating with the other applications of the application group may be provided to the computer system 204. The computer system 204 may retain the application credentials information 214 in storage and may associate the application credentials information 214 with the application 212 for use in enabling communication with members of the application group.

The computer system 204 may be configured with an overlay network entity 216. The overlay network entity 216 may be abstracted to be between the application layer and the transport or network layer of the computer system 204. The overlay network entity 216 may further be a gateway that is used for enabling communication between the application 212 and other applications (for example, within an application group) in a concerted manner. Traffic between the application 212 and members of the application may be routed through the overlay network entity 216, whereby the overlay network entity 216 may be responsible for routing the traffic and performing any encryption or decryption operations, among others, per the application credentials information 214. Accordingly, as the application 212 communicates with other applications in an application group and as applications are added to or removed from the application group, the application 212 may not be required to be modified or "retrofitted" for communication to be facilitated.

The application deployment entity 202 may cause the overlay network entity 216 to be configured for routing data transmitted or received by the application 212. As shown in FIG. 2, the overlay network entity 216 may be configured with a network address 218 of the application 212. The network address 218 may be used to indicate that the application 212 is a source or destination for data. The network address 218 of the application 212 may be unique and may be different from a network address 220 of the computer system 204, which may alternatively be used to indicate that the computer system 204 is the source or destination for data. The overlay network entity 216 may be an intermediary for data trafficked by the application 212 or may transmit outgoing data or receive incoming data using communications capabilities of the computer system 204 as described herein.

Figure 3:
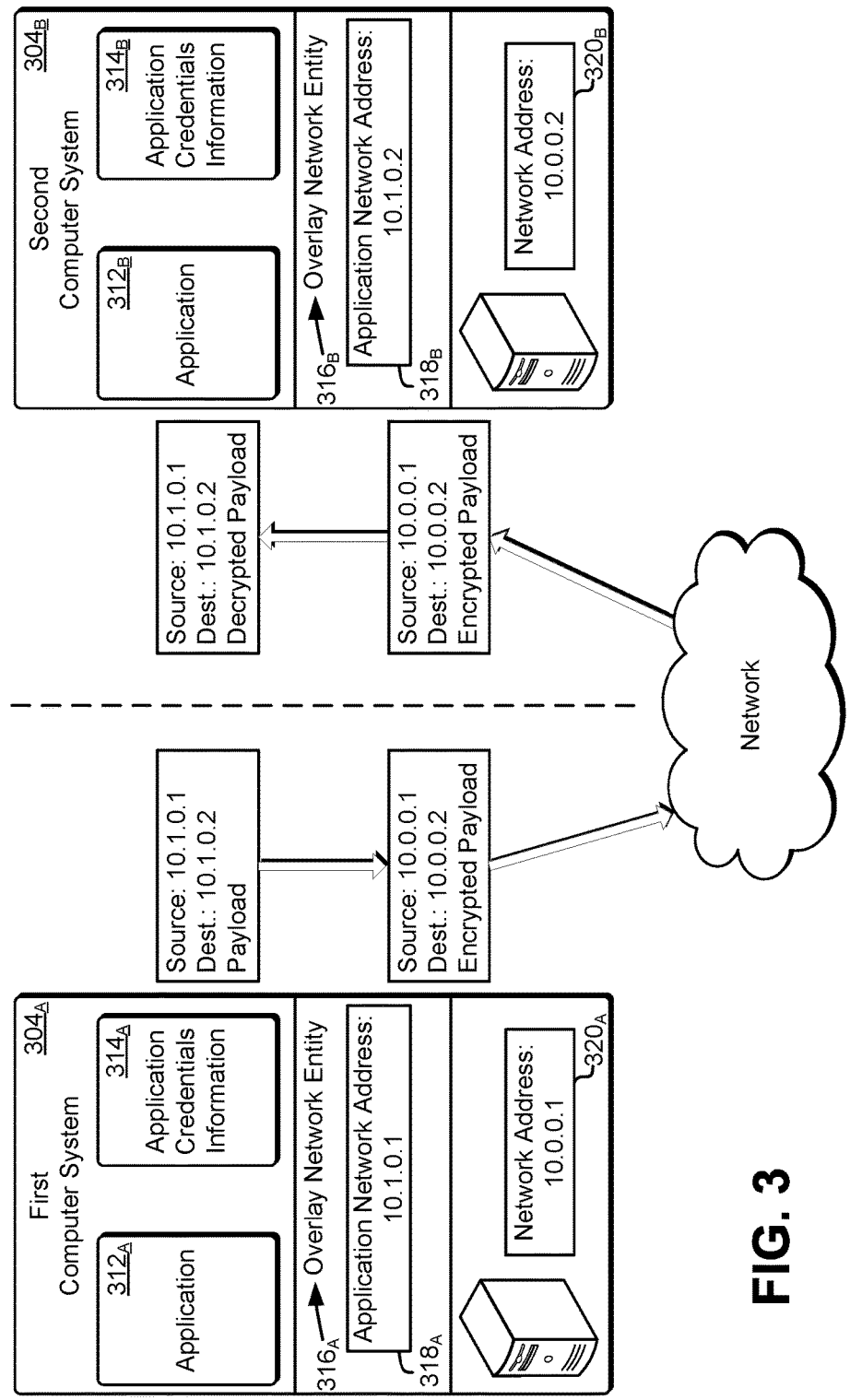
FIG. 3 shows an example of communication among application group members in accordance with at least one embodiment.

FIG. 3 shows an example of communication among application group members in accordance with at least one embodiment. A first computer system $304_A$ and a second computer system $304_B$ (collectively referred to herein after by the numeral alone) are shown in FIG. 3. The computer systems 304 are similar to the computer system described with reference to numeral 204 in FIG. 2. A first application $312_A$ is executed on the first computer system $304_A$, and the first application $312_A$ is a member of the same application group as a second application $312_B$ executed on the second computer system $304_B$. It is noted that even though the "first" and "second" designations are not shown in FIG. 3, reference numerals are used herein to reflect the designations.

A message exchange between the first application $312_A$ and the second application $312_B$ is shown in FIG. 3, whereby the message exchange is facilitated by the first overlay network entity $316_A$ of the first computer system $304_A$ and the second overlay network entity $316_B$ of the second computer system $304_B$.

The configuration information (for example, retained by the configuration information storage) is used to configure the overlay network entities 316 to route data between the applications 312. The configuration information may specify to which application an overlay network entity 316 pertains. Typically an overlay network entity 316 services applications of the same application group. If a computer system 304 executes more than one application of the same application group, the more than one application may share the overlay network entity 316 or each application may have an independent overlay network entity 316. Further, the overlay network entity 316 may be configured with network addresses of applications serviced by the overlay network entity 316. For example, the first overlay network entity $316_A$ providing routing service to the first application $312_A$ may be configured to identify that data addressed to 10.1.0.1 pertains to the first application $312_A$.

The configuration information may also be used to set or configure the routing preferences of the first computer system $304_A$ such that data originating from or destined to the first application $312_A$ may be routed to the first overlay network entity $316_A$. It is noted that the first computer system $304_A$ may be configured with a routing table that specifies a preference of routing destination of data (such as packet data). The routing table of the first computer system $304_A$ may be set as follows:

TABLE 1

Example of a routing table of the first computer system $304_A$

| Weight | Destination Address | Route |
| --- | --- | --- |
| 100 | 10.1.0.2 | Overlay Network Entity $316_A$ |
| 1 | All | Network Adapter of First Computer System $304_A$ |

The example of the routing table specifies that data addressed to the second application $312_B$ executed on the second computer system $304_B$ should be preferentially favored by a factor of 100 to 1 to the first overlay network entity $316_A$. Conversely, other traffic of the first computer system $304_A$ may be routed to the network adapter (not shown) of the first computer system $304_A$. It is noted that although a network adapter is referenced herein, the first computer system $304_A$ may be equipped with any other type of communication or routing device or entity. For example, if the first computer system $304_A$ is a virtual computer system that is instantiated using underlying hardware resources, the first computer system $304_A$ may be equipped with a virtual network adapter that is responsible for routing traffic within the first computer system $304_A$ or externally (for example, to a network). The routing table may also be similarly configured to cause traffic addressed to other members of an application group to be routed to the first overlay network entity $316_A$.

Upon receiving routed traffic, the first overlay network entity $316_A$ may perform one or more operations on the traffic and cause the traffic to be forwarded to the network adapter of the first computer system $304_A$. The network adapter of the first computer system $304_A$ then forwards the traffic further along a routing path to a destination. As specified in the first application credentials information $314_A$, various operations, such as encryption, may be performed on the traffic or a data payload of the traffic. The first overlay network entity $316_A$ or another entity of the first computer system $304_A$ may perform the operations. Further, the first overlay network entity $316_A$ may be configured to identify a network address of the destination computer system of the traffic. For example, the first overlay network entity $316_A$ may be provided with a mapping or correspondence between addresses of applications that are part of the same application group as the first application $312_A$ and their corresponding computer system network addresses. As shown in FIG. 3, the first overlay network entity $316_A$ identifies the network address of the second computer system $304_B$ executing the second application $312_B$ and causes outgoing traffic to be addressed to the second computer system $304_B$. The first overlay network entity $316_A$ then forwards the traffic to the network device of the first computer system $304_A$, which in turn forwards the traffic further along a network path to the second computer system $304_B$.

As described herein, upon receiving the traffic, the second computer system $304_B$ identifies that the traffic is destined to the second application $312_B$. Due at least in part to the fact that the second overlay network entity $316_B$ is responsible for routing data of the second application $312_B$, the second computer system $304_B$ or a network device thereof routes the traffic to the second overlay network entity $316_B$. The second overlay network entity $316_B$ may reverse any operations performed by the first overlay network entity $316_A$ by, for example, decrypting received data packets. Further, the second overlay network entity $316_B$ restores any source or destination address changes performed by the first overlay network entity $316_A$.

Figure 4:
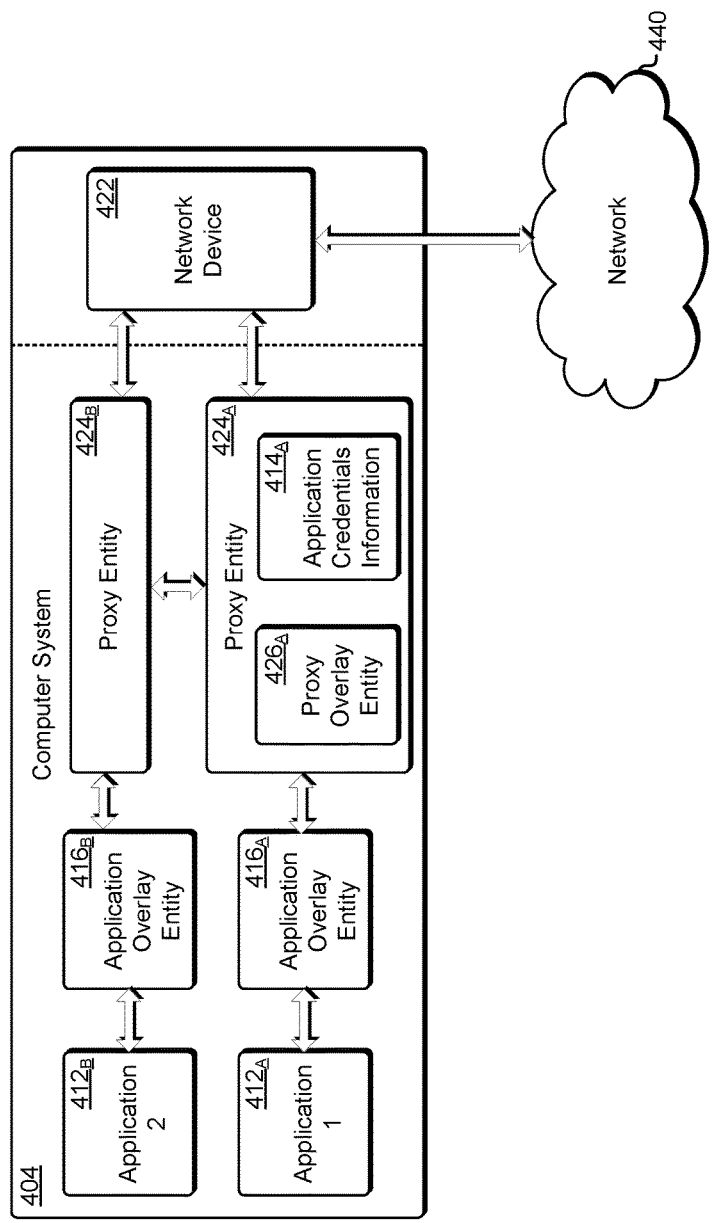
FIG. 4 shows an example of communication among application group members in accordance with at least one embodiment.

FIG. 4 shows an example of communication among application group members in accordance with at least one embodiment. A computer system 404 is configured to execute a first application (denoted as application 1 and referred to herein as first application $412_A$) and a second application (denoted as application 2 and referred to herein as second application $412_B$). The computer system 404 is equipped with a network device 422 that facilitates communication between the computer system 404 and other computer systems (not shown) over a network 440. The network device 422 as described herein may be a network adapter or a modem, among others. The first application $412_A$ and the second application $412_B$ may part of the same application group or they may belong to different application groups. In FIG. 4, the first application $412_A$ and the second application $412_B$ are shown to be each associated with an application overlay entity $416_{A-B}$. However, it is noted that if the first application $412_A$ and the second application $412_B$ belong to the same application group, the first application $412_A$ and the second application $412_B$ may share one application overlay entity.

Data that is sent by the first application $412_A$ or addressed to the first application $412_A$ may be routed via the first application overlay entity $416_A$. As described herein, the data may be any type of information including bits, bytes or packets that are structured in accordance with any communications protocol. The first application overlay entity $416_A$ may serve as a dedicated router for the first application $412_A$ whereby all data transmitted by or received by the first application $412_A$ is routed via the first application overlay entity $416_A$. The first application overlay entity $416_A$ may be configured to direct traffic pertaining to the first application $412_A$ to a first proxy entity $424_A$. A pre-specified port may be used for routing traffic to the first proxy entity $424_A$. Further, the configuration information may be used to specify an identity associated with the first proxy entity $424_A$. The first application overlay entity $416_A$ may identify traffic pertaining to the first application $412_A$ based at least in part on an address associated with the first application $412_A$. For example, the first application overlay entity $416_A$ may be configured to associate the address of the first application $412_A$ with the first proxy entity $424_A$ and determine that data is to be routed to the first proxy entity $424_A$ based at least in part on a source address of the data originating from the first application $412_A$.

The first proxy entity $424_A$ includes a first proxy overlay entity $426_A$. The first proxy overlay entity $426_A$ is configured to evaluate data routed through the first proxy entity $424_A$ and determine a destination for the data. For example, if the first proxy overlay entity $426_A$ determines that the destination of the data is the second application $412_B$, the first proxy overlay entity $426_A$ routes the data to the second proxy entity $424_B$, whereby the data will be forwarded to the second application $412_B$. Further, if the first proxy overlay entity $426_A$ serves both for the first application $412_A$ and the second application $412_B$, the first proxy overlay entity $426_A$ may route the data directly and without an intermediary to the second application $412_B$. Because the first application $412_A$ and the second application $412_B$ are both executed on the first computer system $404_A$, the data may be sent without encryption or other security-based operations that are performed to secure the data. The first proxy overlay entity $426_A$ may be provided with configuration information that identifies applications that belong to an application group as well as one or more network addresses associated with each application. Further, the configuration information may specify the identities or network addresses of each computer system on which an application that is a member of the application group is executed. As described herein, an application may be associated with an address that is non-overlapping with addresses pertaining to other applications or computer systems. In addition to routing, the first proxy entity $424_A$ may perform data filtering or may classify data in various categories. Further, the first proxy entity $424_A$ may ensure the integrity of data communicated by an associated application.

After determining that data sent by the first application $412_A$ is addressed to an application executed on another computer system, the first proxy entity $424_A$ performs necessary operations on the data as specified in the first application credentials information $414_A$ to produce transformed data. Further, the first proxy entity $424_A$ sends the transformed data to the network device 422 for transmission to the destination computer system. In addition, the addressing information of the transformed data may be modified, whereby the source address may be set to the network address of the first computer system $404_A$ and the destination address may be set to the network address of the destination computer system.

Address translation may be required to be performed to route data over the network. As described herein, the data may be packet data that is associated with both source and destination addresses. Data exchanged between members of an application group may have a first field, such as a packet data header, that specifies an address of the source of the data (for example, the network address of the first application $412_A$ and a second field that specifies an address of the destination of the data (for example, the network address of a second application). Causing the data to be routed over a network may include translating the source and destination addresses of the applications to the corresponding computer systems to which the applications are deployed. Accordingly, the source and destination addresses associated with the data may be those of the originating and terminating computer systems as opposed to the originating and terminating applications.

In an embodiment, nested headers may be used for address translation, whereby transformed data may be incorporated in a payload of a packet. Further, one or more fields associated with the packet may specify the network addresses of the source and destination computer systems and information usable by a receiving party (such as the destination computer system) for decrypting the transformed data or identifying a destination application of the data. In another embodiment, static replacement of source and destination addresses associated with the data may be performed. For example, for data originating from a first application and addressed to a second application, address fields associated with the data may be translated by substituting application addresses with the computer systems addresses to which the applications are deployed. When the data is received by a destination computer system, the destination computer system may be configured to inspect the data (for example, by evaluating one or more fields of the packet) and identify the destination application or the source application of the data. Following the identification, the receiving computer system may substitute the network addresses of the originating and destination computer systems with those of the originating and destination applications. The data may then be forwarded to the destination application.

In some embodiments an address space may be reserved for a plurality of applications belonging to an application group. For example, the address space of 10.1.0.0/16 may be reserved for a first application group and the address space of 10.2.0.0/16 may be reserved for a second application group, whereby the application group may be identifiable by the second position of network address. The address space of a plurality of computer systems executing the applications may not overlap with the address space of the application groups, whereby, for example, the address space of the plurality of computer systems may be 10.0.0.0/16. The use of non-overlapping addresses spaces facilitates routing in the computer system. For example, a routing table of the computer system 404 may be configured as shown in Table 2.

TABLE 2

Example of a routing table of the computer system 404

| Weight | Destination Address | Route |
|---|---|---|
| 100 | 10.1.0.1 | First Proxy Entity $424_A$ |
| 100 | 10.2.0.1 | Second Proxy Entity $424_B$ |
| 100 | 10.0.0.1 | Network Device 422 of Computer System 404 |

Per Table 2, when the first application $412_A$ and the second application $412_B$ do not share a proxy entity, data that is addressed to the first application $412_A$ (i.e., addressed to 10.1.0.1) is routed to the first proxy entity $424_A$ of the first application $412_A$, whereas data that is addressed to the second application $412_B$ (i.e., addressed to 10.2.0.1) is routed to the second proxy entity $424_B$ of the second application $412_B$. Conversely data that is addressed to a network address of the computer system 404 is provided to the network device 422 of the computer system 404. The use of a non-overlapping address space is advantageous in that it permits certainty in routing, whereby a one-to-one correspondence exists between a destination address and a preferred route for the data.

A proxy entity, such as the first proxy entity $424_A$, or any other routing entity may be implemented as a virtual network adapter. The virtual network adapter may be a driver, an application, one or more software modules or execution routines, among others, and may be exposed as an application programming interface to the computer system. The virtual network adapter may utilize an underlying network device (such as a network adapter) for external data communication. As described herein, when the proxy entity is implemented as a virtual network adapter, the proxy entity may cause data to be routed to the network adapter for transmission over a network to another computer system. Further, the proxy entity may perform encryption of the data prior to transmission or decryption after the data is received.

The virtual network adapter may be launched or the execution of the virtual network adapter may commence in response to launching or executing a corresponding application for which the virtual network adapter serves as a proxy entity. For example, the application may cause the virtual network adapter to be launched. In addition, an entity executed on a hypervisor may detect that an application was launched and may cause the virtual network adapter to be launched. Similarly, the virtual network adapter may be terminated or may cease running or being executed upon detecting that a corresponding application has ceased operations or terminated. If the virtual network adapter serves a plurality of applications, a count of the number of applications of the plurality that are presently executed may be maintained. The count may be incremented or decremented in response to launching or terminating an application of the plurality of application, respectively. The count may then be used to determine whether the virtual network adapter serving the plurality of applications is to be launched or terminated. For example, the virtual network adapter may be launched if the count increases to a value over zero or terminated if the count decreases to a zero value.

Figure 5:
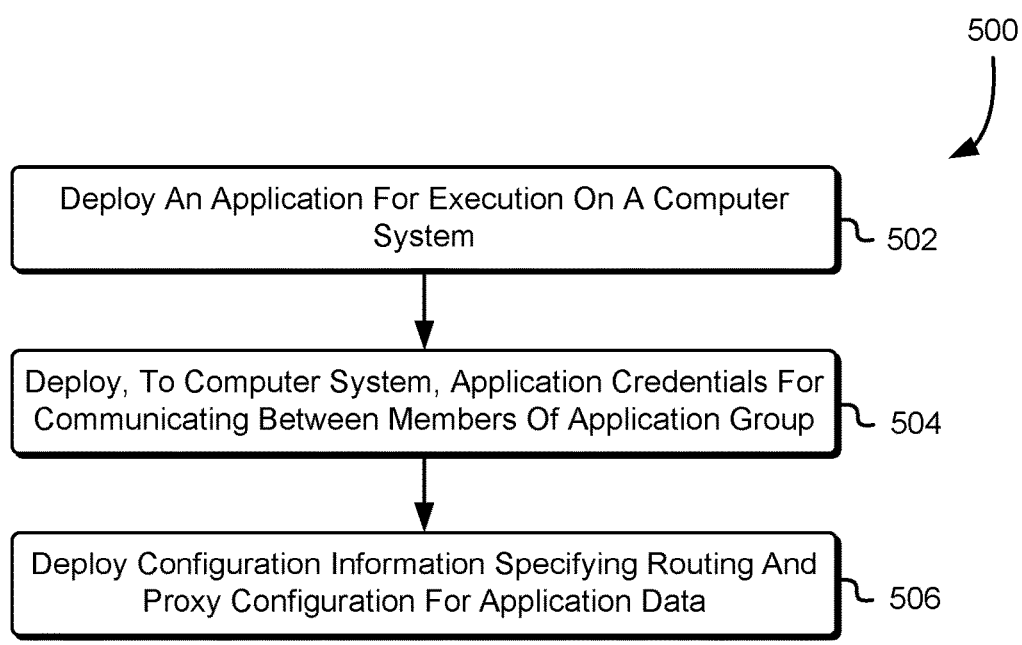
FIG. 5 shows an example of a method for application deployment in accordance with at least one embodiment.

FIG. 5 shows an example of a method for application deployment in accordance with at least one embodiment. In the process 500, a deployment entity, such as the application deployment entity described with reference to numeral 202, deploys 502 an application for execution on a computer system. As described herein, deploying an application may include causing computer-readable instructions that define the application to be sent to the computer system. The application may utilize the infrastructure of the computer system including hardware and software resources to operate.

The deployment entity also deploys 504, to the computer system, application credentials for use in communicating between members of an application group. As described herein, the application credentials may specify any type of operations that are required to be performed on data exchanged between the deployed application and other applications. The application credentials may be applied to data that is trafficked by the application and sent over a public channel, such as a network including an intranet, an internet service provider (ISP) network or the Internet. For example, the application credentials may be applied to data that is exchanged by the application and that is transmitted from the computer system to an external entity. Conversely, data may not be transformed in accordance with the application credentials if the data is exchanged between applications that are executed on the computer system.

The deployment entity also deploys 506 configuration information specifying routing and proxy configuration for application data. The configuration information specifies the identities of applications that belong to an application group, their network addresses, the identities of computer systems on which the applications are executed, the network addresses of the computer system, among other information. The configuration information also specifies whether an overlay network entity or a proxy entity is to be configured for an application as described with reference to FIGS. 3 and 4 herein. Further, the configuration information may specify the identities of applications an overlay network entity or a proxy entity serves, whereby the configuration information may include an indication of whether the overlay network entity or proxy entity serves only one application or a plurality of application executed on the computer system. In addition, the configuration information may specify routing configurations for the overlay network entity or proxy entity. For example, the configuration information may specify any changes to existing routing tables that may be required to be made in order for packet data exchanged by an application to be routed to various entities along a communication path including an overlay network entity, proxy entity or network device of a computer system. Upon receipt of the configuration information, the computer system may execute one or more overlay network entities or proxy entities in accordance with the configuration information.

Figure 6:
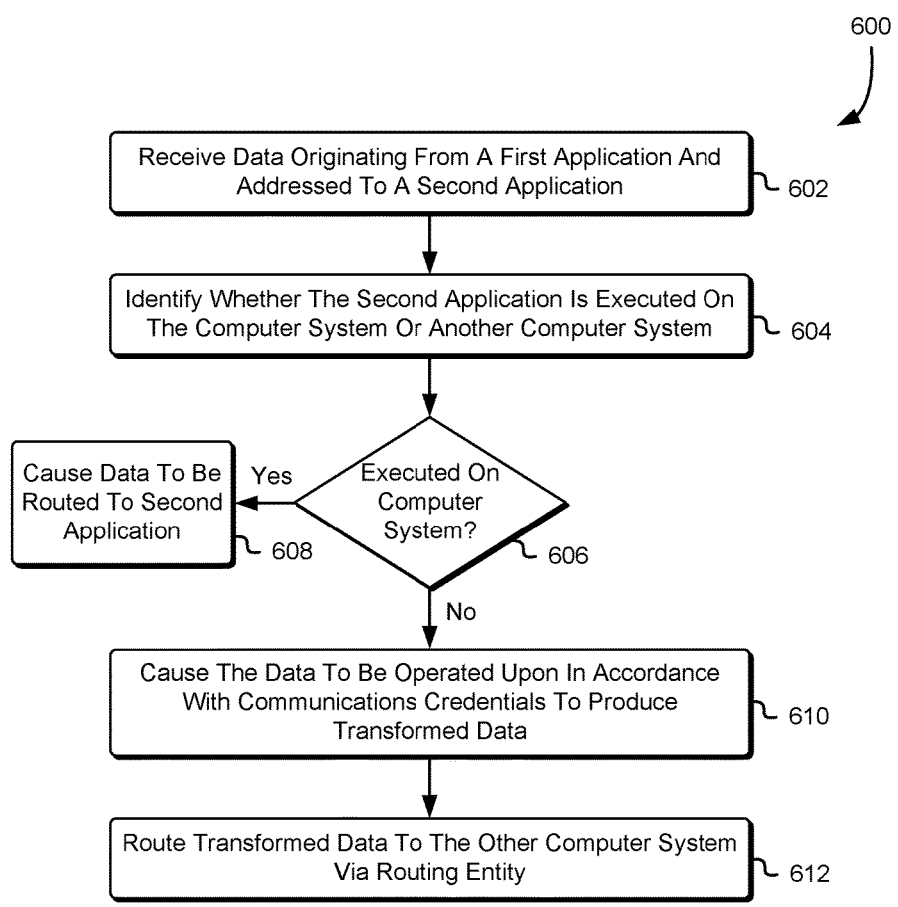
FIG. 6 shows an example of a method for routing data by a proxy entity in accordance with at least one embodiment.

FIG. 6 shows an example of a method for routing data by a proxy entity in accordance with at least one embodiment. In the process 600, a proxy entity, such as the first proxy entity $424_A$ described with reference to FIG. 4, receives 602 data originating from a first application and addressed to a second application. The data may be received from an application overlay entity of the first application, whereby the application overlay entity may be a gateway or an interface that is responsible for routing application data. The application overlay entity may be decoupled from the application and is advantageous in that it facilitates separating application development from the routing of application data. The application overlay entity may be configured to run on the computer system by the application deployment entity as part of application deployment. Accordingly, all data exchanged by the first application may be routed via the application overlay entity, whereby the application overlay entity may be configured to route data originating from the application to the proxy entity and route data addressed to the application from the proxy entity to the application. Because the application overlay entity is dedicated to the application it obviates the use of a weight-based routing table at the routing stage and ensures that data is routed between the proxy entity and the application.

The proxy entity then identifies 604 whether the second application is executed on the computer system or another computer system, whereby the first application and the second application may be part of an application group. Further, the identification may be based at least in part on received configuration information. If it is determined 606 that the second application is executed on the computer system, the proxy entity causes 608 the data to be routed to the second application. As described herein, due at least in part to the fact that the first application and the second application are executed on the same computer system, the data may be routed without taking protection or security measures on the data including encryption. If, on the other hand, it is determined 606 that the second application is executed on another computer system, the proxy entity causes 610 the data to be operated upon in accordance with communications credentials, whereby the one or more operations may include encrypting the data to produce transformed data.

The proxy entity then routes 612 the transformed data to the other computer system via a routing entity. The routing entity may be a network adapter of the computer system, which may be responsible for routing all data associated with the computer system to a broader network. As described herein, the transformed data is received by the other computer system executing the second application. A proxy entity associated with the second application processes the transformed data to reconstitute the data provided by the first application. The proxy entity of the second application may then send the data to the second application via an application overlay entity of the second application.

Figure 7:
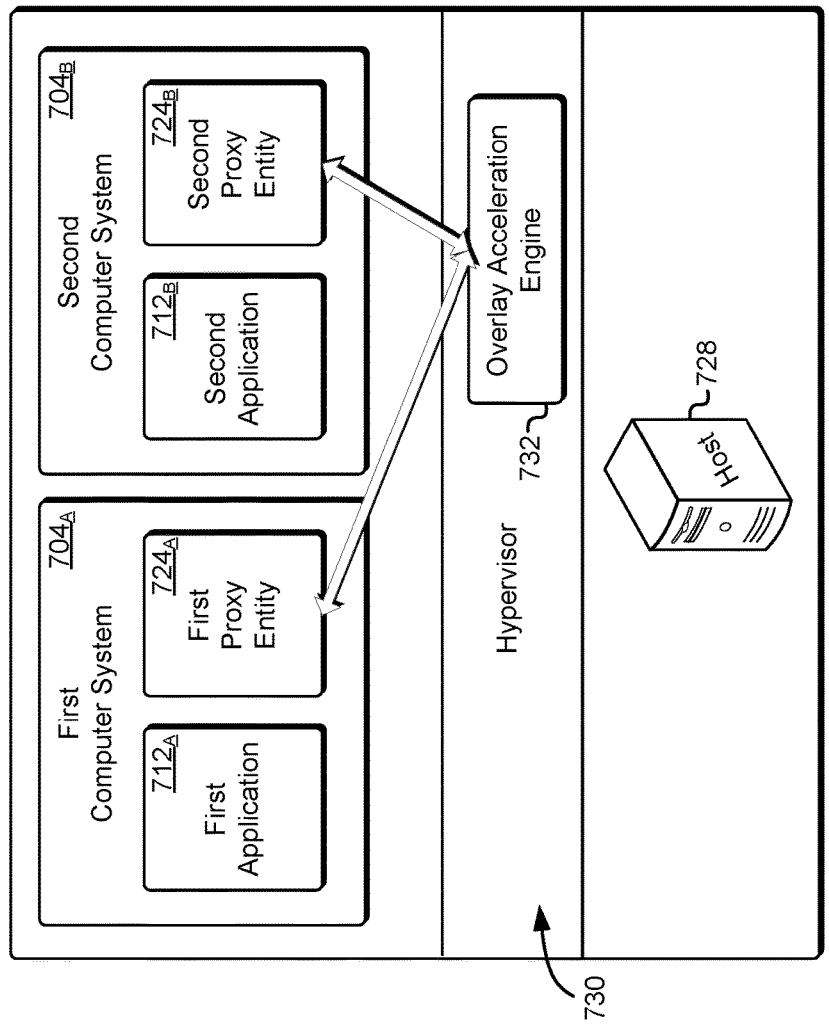
FIG. 7 shows an example of an overlay acceleration engine in accordance with at least one embodiment.

FIG. 7 shows an example of an overlay acceleration engine in accordance with at least one embodiment. A first computer system $704_A$ and a second computer system $704_B$ (collectively herein referred to as computer systems 704) are instantiated on a host 728 using a hypervisor 730. Although the host 728 is described with reference to FIG. 7, it may be contemplated that the host 728 may be any type of computing system such as a server. The computer systems 704 may be virtual computer systems that are implemented using the underlying computing hardware resources (such as a central processing unit, memory or network interface) of the host 728. The hypervisor 730 facilitates the execution of the computer systems 704. The hypervisor 730, which may be an example of a virtualization layer, may be any type of computer readable instruction or software, firmware or hardware that instantiates and runs virtual machines or virtual computer systems. The hypervisor 730 may enable providing the first computer system $704_A$ and the second computer system $704_B$ with operating systems that facilitate running the computer systems 704 independently of one another as if an independent underlying hardware was used for each computer system.

The first computer system $704_A$ executes a first application $712_A$ and the second computer system $704_B$ executes a second application $712_B$ collectively referred herein by the numeral alone. The first application $712_A$ is associated with a first proxy entity $724_A$ that routes data associated with the first application $712_A$ and performs operations associated with securing the data as described herein. Further, the first proxy entity $724_A$ may perform data filtering or data classification. For example, when sending or receiving data associated with the application, the first proxy entity $724_A$ may classify portions or packets of the data into a plurality of categories. Similarly to the first application $712_A$ the second application $712_B$ is associated with a second proxy entity $724_B$.

The applications 712 may belong to the same application group or to different application groups. If the applications 712 belong to the same application group, an overlay acceleration engine 732 executed on the host 728 as part of the hypervisor 730 may be used to enable communication between the applications. The overlay acceleration engine 732 may be used to create a back channel between the applications 712 and optimize communication between the applications 712. For example, communication between the applications 712 may not be routed using an entity external (for example, routers of a network such as an intranet) to the host 728 and instead may be routed via the overlay acceleration engine 732. The use of the overlay acceleration engine 732 is advantageous in that communication latency between the applications may be reduced. Further, the utilization of the overlay acceleration engine 732 obviates the need for data encryption or the like. Instead the applications 712 may exchange untransformed data (for example, unencrypted data) communication over a secure channel as provided by the overlay acceleration engine 732.

Figure 8:
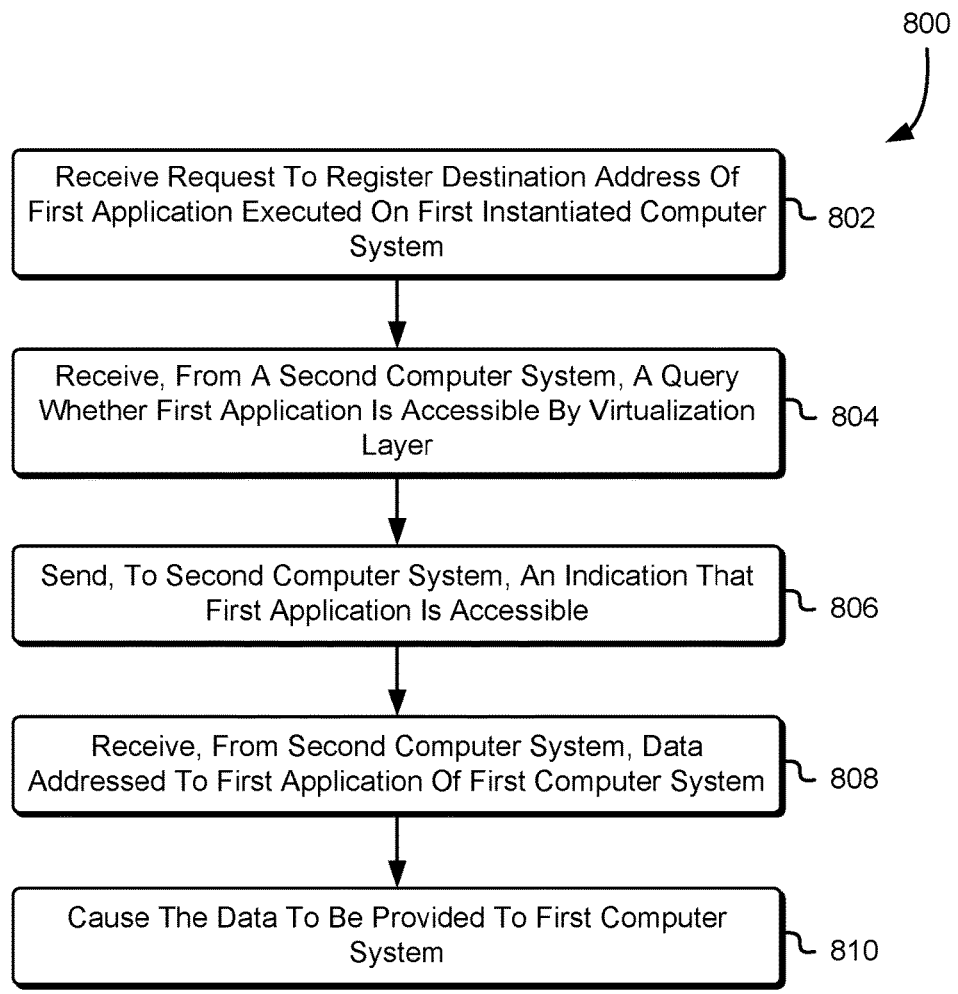
FIG. 8 shows an example of a method for routing data through a virtualization layer in accordance with at least one embodiment.

FIG. 8 shows an example of a method for routing data through a virtualization layer in accordance with at least one embodiment. In the process 800, an overlay acceleration engine, such as the overlay acceleration engine 732 described with reference to FIG. 7, receives 802 a request to register a destination address of a first application executed on a first instantiated computer system. The overlay acceleration engine may be part of a virtualization layer (for example, hypervisor) that is configured to instantiate one or more virtual computer systems and the request may be made using a hypercall to the hypervisor. The overlay acceleration engine stores registered addresses in memory, which may be a cache that facilitates expeditious determination of addresses that are registered with the overlay acceleration engine. The overlay acceleration engine may serve as a back channel for routing data associated with the registered applications. Further, the overlay acceleration engine may use polling or asynchronous notification to update a data structure, such as the cache, with registered addresses.

The overlay acceleration engine then receives 804, from a second computer system, a query as to whether the first application is accessible by the virtualization layer. For example, a second application executed on the second computer system may seek to send data to the first application and it may be sought to be determined whether a hypervisor-enabled back-channel may be used for transmitting the data. The overlay acceleration engine determines whether the first application is accessible and if so, sends 806, to the second computer system, an indication that the first application is accessible.

The overlay acceleration engine then receives 808, from the second computer system, data addressed to the first application of the first computer system. The data may be provided to the overlay acceleration engine using a hypercall or may be provided in a buffer accessible by the overlay acceleration engine. Further, polling or asynchronous function calls may be used by the overlay acceleration engine or a computer system for data exchanges. The overlay acceleration engine then causes 810 the received data to be provided to the first computer system. As described herein, each computer system that is instantiated using the virtualization layer may be equipped with a proxy entity that communicates with and routes data through the overlay acceleration engine.

Figure 9:
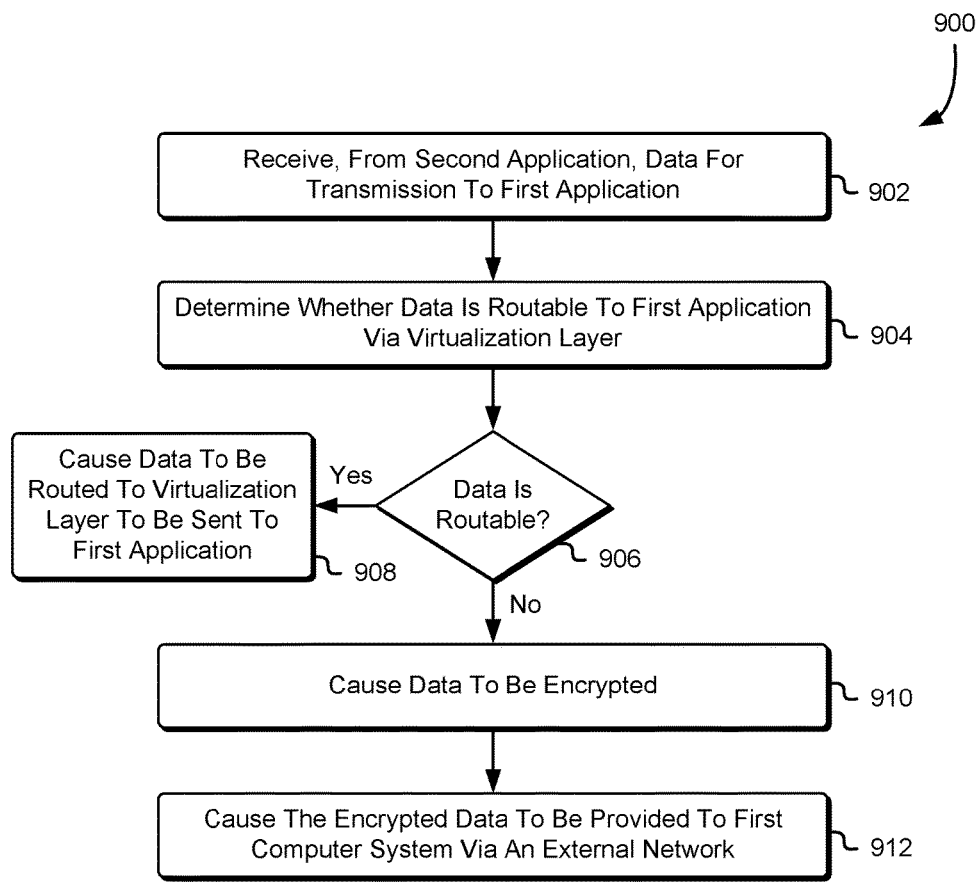
FIG. 9 shows an example of a method for routing application data via a virtualization layer in accordance with at least one embodiment.

FIG. 9 shows an example of a method for routing application data via a virtualization layer in accordance with at least one embodiment. A second proxy entity that serves an application, such as the second proxy entity $724_B$ described with reference to FIG. 7, receives 902, from a second application, data for transmission to a first application. The data may be received from an application overlay entity, such as the application overlay entity $416_B$ described with reference to FIG. 4. The second proxy entity then determines 904 whether the data is routable to a first application via a virtualization layer upon which the second application together with the second proxy entity are executed. The determination may be based at least in part on querying the virtualization layer or an overlay acceleration engine thereof (for example, using a hypercall) to determine whether an address associated with the first application or an address associated with a first computer system upon which the first application is executed is registered with the virtualization layer or the overlay acceleration engine.

If it is determined 906 that the data is routable to the first application via the virtualization layer, the second proxy entity causes 908 the data to be routed to the virtualization layer. The data may be unencrypted due at least in part to the fact that communication via the virtualization layer is assumed to be protected. If a negative determination 906 is made, the second proxy entity causes 910 the data to be encrypted. Further, the second proxy entity causes 912 the data to be provided to the first computer system via an external network. For example, the data may be placed in a network buffer for transmission over a network to the first computer system.

Figure 10:
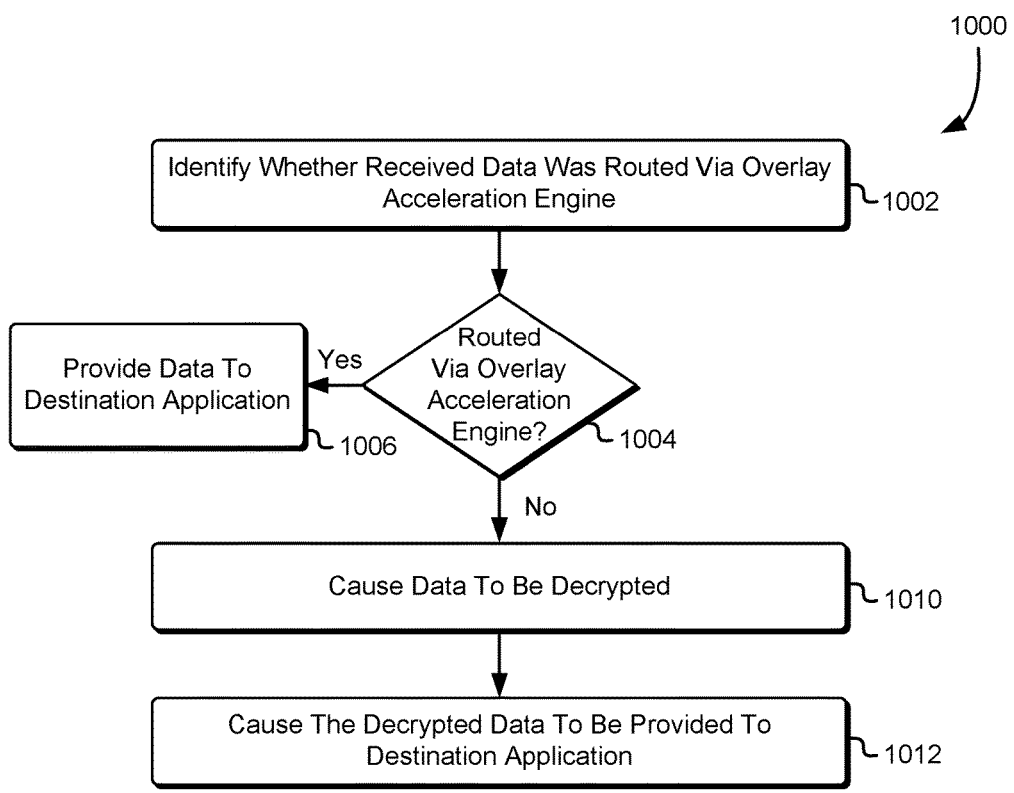
FIG. 10 shows an example of a method for receiving application data in accordance with at least one embodiment.

FIG. 10 shows an example of a method for receiving application data in accordance with at least one embodiment. In the process 1000, a proxy entity of an application executed on a computer system identifies 1002 whether received data was routed via an overlay acceleration engine of virtualization layer. The received data may be addressed to the application. Further, the identification may be based at least in part on a channel or a data path traversed by the received data. For example, the computer system may have a buffer or another type of data structure for temporarily storing data received from a virtualization layer or an overlay acceleration entity thereof. Further, data received from an external entity to the computer system or a host on which the computer system is instantiated (for example, data that is received by a network adapter or a network device of the host) may be identifiable as such. In addition to identification based at least in part on the channel associated with the data, the data may be inspected to determine the routing. For example, an overlay acceleration engine may modify the data to signify that the data is routed via the overlay acceleration engine. One or more bits of the packet data payload or header (for example, TCP packets) may be used to indicate the routing. Because the data is trafficked locally within virtual computer system instantiated by the host, certain bits of packet data may be used as flags in a non-standardized manner.

If it is determined 1004 that the received data is routed via the overlay acceleration engine, the proxy entity provides 1006 the data to the destination application. As described herein, the proxy entity may provide the data to an application overlay entity, such as the application overlay entity $416_A$ in FIG. 4, and the application overlay entity may in turn forward the data to the destination application. On the other hand, if it is determined 1004 that the received data is not routed via the overlay acceleration engine, the proxy entity causes 1010 the data to be decrypted and causes 1012 the decrypted data to be provided to destination application.

In an embodiment, computer systems may be instantiated on host computer systems in a manner that takes advantage of the backchannel facilitated by the overlay acceleration engine. For example, if two or more applications belong to an application group, the computer systems executing the applications may be advantageously instantiated on the same host computer system so as to facilitate communication between the application using the virtualization layer and with the need for sending or receiving the communication over a network.

Figure 11:
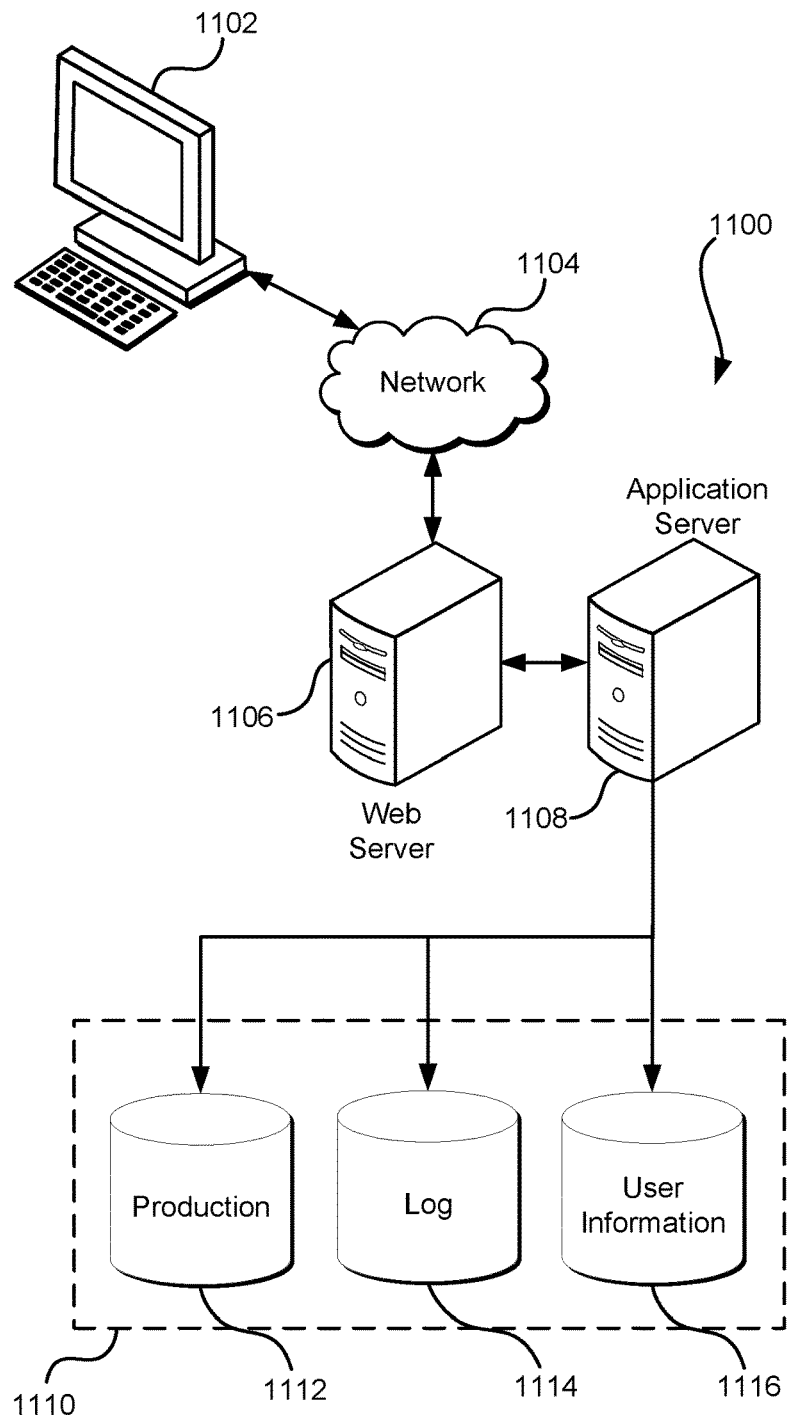
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the electronic client device 1102 and the application server 1108, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the electronic client device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the example environment 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    detecting, at a computing device, a communication to a network location via a first communications channel, the network location associated with an encryption configuration for communications from the computing device to the network location;
    determining at least in part on whether the network location is at a different computing device from the computing device, that the communication is to be encrypted;
    generating an encrypted communication by encrypting the communication according to the encryption configuration of the network location; and
    routing the encrypted communication via a different second communications channel.

2. The computer-implemented method of claim 1, further comprising, in response to detecting the network location is located on the computing device, using a proxy entity to route the communication via the first communications channel.

3. The computer-implemented method of claim 1, further comprising routing the communication to the network location via an overlay network.

4. The computer-implemented method of claim 1, further comprising:
    performing address translation for transmission of the communication; and
    routing the communication to the network location in accordance with the address translation.

5. The computer-implemented method of claim 1, wherein:
    the first communications channel is usable for routing the communication to the network location via an overlay network entity on the same computing device; and
    the second communications channel is usable for routing the communication to the network location at the different computing device via a network that is communicatively coupled between the computing device and the different computing device.

6. The computer-implemented method of claim 1, wherein:
    the computing device hosts a virtual computing device and a virtualization layer that supports the virtual computing device; and
    the first communications channel utilizes the virtualization layer.

7. The computer-implemented method of claim 6, further comprising determining, based at least in part on whether the network location is accessible to the virtualization layer, whether the network location is at the different computing device from the computing device.

8. A system, comprising:
    memory to store computer-executable instructions, which, if performed by one or more processors, cause the system to at least:
        detect, at a computing device, a communication to a network location associated with an encryption configuration for communications from the computing device to the network location;

select a communications channel based at least in part on whether the network location is at a different computing device from the computing device;

generate an encrypted communication by encrypting the communication according to the encryption configuration of the network location; and route the encrypted communication via the communications channel.

9. The system of claim 8, wherein the computer-executable instructions further include instructions that cause the system to:

detect a second communication; and decrypt the second communication dependent at least in part on detecting the second communication was directed to the different computing device from the computing device.

10. The system of claim 8, wherein the computer-executable instructions further include instructions that cause the system to instantiate a virtual network adapter to facilitate transmission of the communication from a source network address to a destination network address.

11. The system of claim 8, wherein:

the communication is associated with:

a first network address corresponding to a computing device performing a first application; and a second network address corresponding to a computing device performing a second application; and the first and second applications are configured to exchange data between each other.

12. The system of claim 11, wherein the first network address and the second network address are incorporated into a data packet that includes at least a portion of the communication.

13. The system of claim 8, wherein:

the communication is between a first and second application; and the computer-executable instructions include instructions that further cause the system to encrypt the communication using credentials information associated with first and second applications.

14. The system of claim 13, wherein the credentials information is provided by an application deployment entity for use in encryption of data exchanged between the first and second application.

15. A non-transitory computer-readable storage medium that stores executable instructions, which, if executed by one or more processors of a computer system, cause the computer system to at least:

detect, at a computing device, a communication to a network location associated with an encryption configuration for communications from the computing device to the network location;

select a communications channel based at least in part on whether the network location is at a different computing device from the computing device; and route the communication via the communications channel.

16. The non-transitory computer-readable storage medium of claim 15, wherein the executable instructions that route the communication cause the system to route the communication in unencrypted form.

17. The non-transitory computer-readable storage medium of claim 15, wherein the communication is between members of a group of software applications that exchange data between each other.

18. The non-transitory computer-readable storage medium of claim 17, wherein the executable instructions that cause the computer system to route the communication via the communications channel on a condition that the network location is at a same computing device as the computing device.

19. The non-transitory computer-readable storage medium of claim 18, wherein the executable instructions further include instructions that cause the computer system to:

on the condition that the network location is at the same computing device as the computing device, route the communication to the network location via an overlay network entity on the same computing device; and on the condition that the network location is at the different computing device from the computing device, route the communication to the network location via a network that is communicatively connected to the different computing device.

20. The non-transitory computer-readable storage medium of claim 19, wherein the executable instructions that cause the computer system to route the communication via the overlay network entity further cause the computer system to route the communication in accordance with a route for an overlay network, the route being associated with an address of a virtual network adapter.

* * * * *